United States Patent [19]

Finn

[11] Patent Number: 4,516,694

[45] Date of Patent: May 14, 1985

[54] SOLVENT FLUSHING ARRANGEMENT FOR FOAM DISPENSING GUN

[75] Inventor: Clifford J. Finn, Wauwatosa, Wis.

[73] Assignee: Universal Foam Systems, Inc., Cudahy, Wis.

[21] Appl. No.: 521,420

[22] Filed: Aug. 8, 1983

[51] Int. Cl.$^3$ ............................................. B67D 1/08
[52] U.S. Cl. .................................. 222/148; 239/112; 366/138; 222/145
[58] Field of Search ...................... 222/145, 148, 150; 239/112, 113, 414; 251/346; 366/138

[56] References Cited

U.S. PATENT DOCUMENTS

| | | | |
|---|---|---|---|
| 3,541,023 | 11/1970 | Cole | 239/112 |
| 3,837,575 | 9/1974 | Lehnert | 239/112 |
| 4,012,822 | 3/1977 | Vrolyk et al. | 222/145 |
| 4,117,551 | 9/1978 | Brooks | 366/162 |
| 4,129,231 | 12/1978 | Larson | 222/145 |
| 4,426,023 | 1/1984 | Sperry et al. | 222/145 |

*Primary Examiner*—Joseph J. Rolla
*Assistant Examiner*—Kenneth Noland
*Attorney, Agent, or Firm*—Ziems, Walter & Shannon

[57] ABSTRACT

A flushing arrangement for a foam dispensing gun operation to dispense at least one resin component which solidifies on exposure to air and including a gun body with an internal passageway adapted to be closed by a valve to establish a passageway portion located downstream from the valve in the context of resin flow past the valve when opened. The flushing arrangement includes a port extending from the exterior of the gun body to the passageway portion immediately downstream from the closed valve so as to enable the circulation of solvent from a pressurized source, such as a squeeze bottle, throughout all surfaces with which the resin comes in contact in the passageway portion.

4 Claims, 4 Drawing Figures

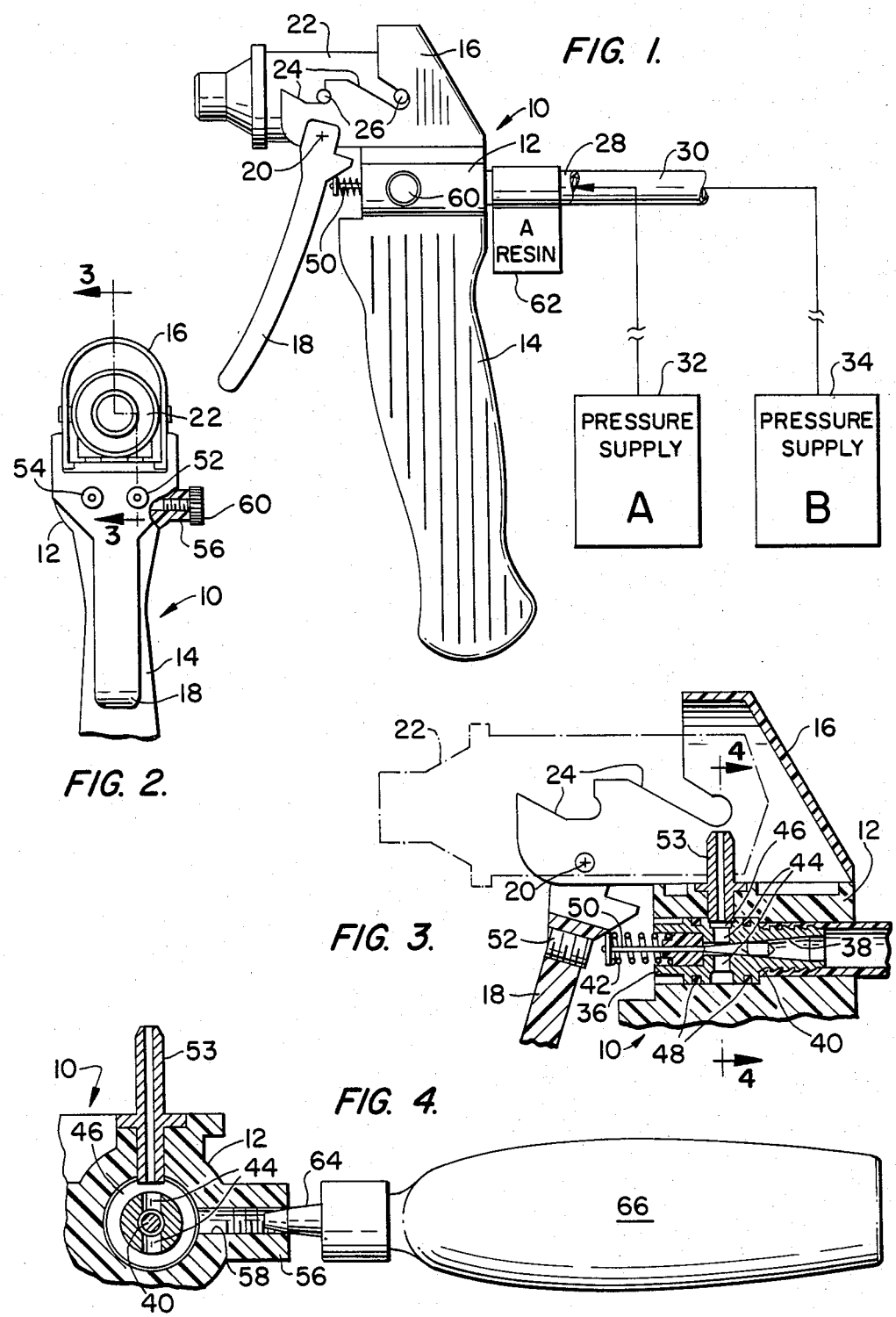

SOLVENT FLUSHING ARRANGEMENT FOR FOAM DISPENSING GUN

BACKGROUND OF THE INVENTION

This invention relates to dispensing apparatus for multi-component foam systems and more particularly, it concerns a solvent cleaning provision for such apparatus.

Foam dispensing guns of the type disclosed in U.S. Pat. Nos. 3,784,110; 4,311,254 and 4,399,930 were developed principally for use with prepackaged foam kits including the two pressurized containers of foam forming chemicals or resins, a dispensing gun and other supplies incidental to dispensing of the supplied resins as foam, such as hoses for attaching the gun to the containers, petroleum jelly for assuring sealed connections of couplings, solvent for cleaning the resins from the gun and a plurality of nozzles adapted for easy replacement in the gun. The resins, commonly referred to as the "A resin" and the "B resin" are supplied separately in the two containers and are typically polymeric isocyanate and polyol amines, respectively. The design of the overall system is such that the separately supplied resins are kept from contact with each other until they are mixed in and discharged from the gun nozzle. The mixture of resins quickly sets up as a rigid foam product which is substantially insoluble and thus extremely difficult, if not impossible, to remove from surfaces with which it comes in contact. Also, because of these characteristics, any substantial interruption in operation of the gun is likely to cause the mixed resins to set up in the nozzle itself and thus prevent further foam dispensing operation. It is for this reason that the nozzles of the gun are replaceable and that each prepackaged kit or system is provided with an adequate supply of the replaceable nozzles.

When the dispensing gun, connected by hoses to the pressurized containers of the two resins, is to be left unattended for an extended period of time such as a lunch break or overnight, recommended procedure involves removing the used nozzle and cleansing the gun of any residual resin using the solvent supplied with the pre-packaged kit. In this respect, the B resin or polyol amine is relatively inert and will remain as a liquid even when exposed to air for a substantial period of time. The A resin or polymeric isocyanate, on the other hand, will solidify upon exposure to air and in time will present a clogging problem or otherwise cause malfunction of relatively movable parts such as valve components with which the A resin comes in contact. The solvent supplied with each kit, therefore, is principally intended to dissolve the unmixed A resin and effectively remove it from any portion of the gun with which it comes it contact after passing the gun valve which isolates from the atmosphere the A resin remaining in passageways extending from the tank up to the valve. However, it is difficult in practice to assure circulation of the solvent into gun parts and other internal surfaces located downstream from the A resin valve. The result of this difficulty, in turn, is often clogging of the A resin passageway to a point where the gun is no longer useful for dispensing all of the resin supplied with each kit.

The replaceable nozzle foam dispensing guns heretofore developed have been highly effective with prepackaged resin kits capable of supplying up to 50 cu. ft. or more of the dispensed foam product. Moreover, the dispensing guns presently in use are highly effective in terms of meeting the economic constraints of temporary use, that is, disposal after resin supplied with each package or kit is dispensed. There is a need however for alleviating the problem of clogged ports and gun valving as a result of the A resin hardening upon exposure to the atmosphere.

SUMMARY OF THE INVENTION

In accordance with the present invention, a foam dispensing gun of the type referred to is provided with a reclosable flushing port by which the fluid passageway extending from the low pressure or downstream side of a closure valve at least for one of the resin supply passageways, may be thoroughly flushed with solvent after use and thereby avoid the deleterious effects of resin solidifying in the passageway upon exposure to the atmosphere. The flushing port extends to the gun body exterior in a manner such that the solvent may be injected easily and under pressure developed by manual compression of a squeeze bottle, for example, in which the solvent is initially supplied and contained for use. Where only one flushing port is provided, it extends to the internal gun passageway through which the air reactive resin (e.g., polymeric isocyanate) is fed during normal operation of the gun.

The principal object of the present invention, therefore, is the provision of an effective solvent flushing system for foam dispensing guns of the type aforementioned. Other objects and further scope of applicability of the present invention will become apparent from the detailed description to follow taken in conjunction with the accompanying drawing in which like parts are designated by like reference numerals.

BRIEF DESCRIPTION OF THE DRAWINGS

FIG. 1 is side elevation of a foam dispensing gun with schematic representation of resin-containing pressure supply containers;

FIG. 2 is a fragmentary front elevation of the gun shown in FIG. 1;

FIG. 3 is a fragmentary cross-section on line 3—3 of FIG. 2; and

FIG. 4 is an enlarged fragmentary cross-section on line 4—4 of FIG. 3.

DETAILED DESCRIPTION OF THE PREFERRED EMBODIMENT

In the drawings, the solvent flushing arrangement of the present invention is shown incorporated in a foam dispensing gun generally designated by the reference numeral 10, the particular embodiment selected for illustration being similar to the gun disclosed in U.S. Pat. No. 4,399,930. As such, the gun 10 includes a body portion 12 to which a handle 14 is rigidly fixed. In practice, the body 12 and the handle 14 constitute a single part formed by injection-molding of a suitable plastic. Slidably mounted on the top of the gun body 12 is breech 16 to which a trigger 18 is mounted for pivotal movement about an axis 20. The breech 16 functions to releasably retain a replaceable nozzle 22 in operative relationship to the gun body 12 and essentially in the position illustrated in FIGS. 1-3. Removal of the nozzle 22 from the position illustrated is effected very easily by rearward movement of the breech 16 from the illustrated position whereupon ramps 24 on the breech coact with lugs 26 on the nozzle to lift the nozzle 22 from its operative position.

As shown in FIG. 1, separate hoses 28 and 30 extend from the back of the gun body 12 to separate containers 32 and 34, respectively. While the containers 32 and 34 are illustrated schematically in FIG. 1, these containers, in practice, each carry a supply of one of two resin components under pressure. Specifically, the container 32 represents a pressurized supply of an A resin whereas the container 34 is a pressurized supply of a B resin. As is well known, when the two resins are released from their containers 32, 34 and mixed in the nozzle 22, they will be discharged as a foam product which solidifies very quickly after discharge from the nozzle.

In FIGS. 3 and 4, the internal gun passageway through which the A resin is supplied from the tank 32 to the interior of the nozzle 22 is illustrated. The passageway is defined in part by a generally cylindrical valve body 36 having a tapered seating surface 38 against which an appropriately shaped valve needle 40 is seated by a compression spring 42. The seating surface 38 opens to radial ports 44 which extend to an annulus 46 defined by a pair of O-ring sealing lands 48. The valve needle 40 includes a forwardly-projecting stem 50 to be engaged by a set screw 52 on the trigger 18 in a manner such that upon actuation of the trigger, the valve needle 40 will be displaced from the seating surface to open the passageway. A vertically-oriented nipple 53 extends the passageway from the annulus 46 to the interior of the nozzle 22 when it is operatively positioned as depicted in phantom lines in FIG. 3, for example. While the comparable internal gun passageway for the B resin, introduced to the gun by way of the hose 30, is not illustrated in the drawings, it is essentially identical to the valve and nipple arrangement illustrated in FIG. 3. Also in this context, the B resin valve (not shown) is actuated by a separate set screw 54 (FIG. 2) provided on the trigger 18. For a more complete description of the gun passageways, reference may be had to the aforementioned U.S. Pat. No. 4,339,950.

As shown in FIGS. 2 and 4 of the drawings, the gun body 12 is formed with a cylindrical boss 56 having an internally-threaded port 58 adapted to receive a removeable threaded plug 60. As shown most clearly in FIG. 4, the port 58 extends from the exterior of the gun body 12 inwardly to the annulus 46 defined by the O-ring lands 48 of valve body 36. The port 58 is provided only for the internal gun passageway through which the A resin is supplied to the nozzle 22 and to assure proper connection of the hoses 28 and 30 to the containers 32 and 34, the hose 28 is preferably tagged with a label 62 (FIG. 1).

Again, as shown in FIG. 4, with the nozzle 22 removed from the gun 10 and the threaded plug 60 removed from the port 58, the dispensing tip 64 of a squeeze bottle 66 may be introduced into the port 58 so that an A resin solvent contained in the squeeze bottle 66 may be injected into the port 58 and outwardly through the tip of the nipple 53. More importantly, the path taken by the solvent introduced to the port 58 assures flushing contact of the solvent with all surfaces contacted by the A resin downstream from the seated needle valve 40 and thus all surfaces at which the A resin may be exposed to the atmosphere. Such surfaces include the internal surfaces of the annulus 46, the radial ports 44 in the valve body 36, the exterior surfaces of the valve needle 40 and the passageway of the nipple 53.

In use, the gun may be operated in conventional fashion with the threaded plug 60 sealing the port 58. When operation of the gun is to be interrupted for an extended period of time such as overnight or during a lunch break, for example, the nozzle 22 is removed, the plug 60 is removed and the squeeze bottle 66 applied to the port 58 to flush the A resin completely from all surfaces with which it has come in contact in the gun interior. The plug may then be replaced and the gun 10 readied for continued operation after the interruption.

Thus, it will be appreciated that as a result of the present invention, a highly effective flushing arrangement is provided for foam dispensing guns of the type mentioned and by which the principal objective, among others, are completely fulfilled. It will be appreciated also that while the flushing arrangement is particularly suited to the illustrated embodiment of a foam dispensing gun, it will be equally applicable to other foam dispensing gun constructions in which an internal A resin gun passage exists downstream from the valve by which discharge of the A resin is controlled. It is expressly intended, therefore, that the foregoing description and accompanying drawings are illustrative only, not limiting, and that the true spirit and scope of the present invention will be determined by reference to the appended claims.

I claim:

1. In a foam dispensing kit comprising a pair of pressurized tanks respectively containing an A resin and a B resin, said A resin being settable on exposure to air, a container of A resin solvent having a solvent discharging tip and means for dispensing said solvent through said discharging tip under pressure, and a dispensing gun having a body to establish a pair of internal resin passageways in separate fluid flow communication with said tanks, respectively, a removable mixing nozzle to receive and mix said A resin and said B resin and to discharge the mixed resins as foam, and separate valves in each of said internal resin passageways, each of said valves having a seat and means engageable with said seat to close said passageways upstream from an internal gun passageway portion, the improvement comprising:

means defining a solvent flushing port in said gun body, said port providing an opening in said body to receive said solvent discharging tip and extending to the internal gun passageway for said A resin at a point downstream from and adjacent to said valve seat in such passageway, whereby discharge of solvent from said container through said port after removal of said nozzle flushes only said internal passageway portion to remove residual amounts of said A resin remaining in said internal passageway portion after closure of the valve means therein.

2. The apparatus recited in claim 1 wherein said means defining a solvent flushing port comprises a cylindrical boss projecting from the body of said gun, said boss having a central threaded bore and including a removable threaded plug means for closing said flushing port during foam dispensing operation of said gun.

3. The apparatus recited in claim 1 wherein said A resin is polymeric isocyanate.

4. In a foam dispensing kit comprising a pair of pressurized tanks respectively containing an A resin and a B resin, a container of A resin solvent having a solvent discharging tip, and a dispensing gun having a body to establish a pair of internal resin passageways in separate fluid flow communication with said tanks, respectively, a replaceable mixing nozzle to receive and mix said A resin and said B resin and to discharge the mixed resins as foam, and separate valves in each of said internal resin passageways to close said passageways upstream from an internal gun passageway portion, the improvement comprising:

means defining a solvent flushing port in said gun body, said port providing an opening in said body to receive said solvent discharging tip and extending to the internal gun passageway for said A resin at a point immediately downstream from said valve means in such passageway, whereby discharge of solvent from said container through said port flushes said internal passageway portion to remove residual amounts of said A resin remaining in said internal passageway portion after closure of the valve means therein, said solvent container comprising a squeeze bottle capable of discharging solvent at said solvent discharge tip under pressure.

* * * * *